United States Patent
Kuwabara et al.

(10) Patent No.: US 7,708,660 B2
(45) Date of Patent: May 4, 2010

(54) BELT TYPE CONTINUOUSLY VARIABLE TRANSMISSION

(75) Inventors: Shinya Kuwabara, Susono (JP); Koichi Tanaka, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 934 days.

(21) Appl. No.: 11/131,257

(22) Filed: May 18, 2005

(65) Prior Publication Data

US 2005/0266944 A1 Dec. 1, 2005

(30) Foreign Application Priority Data

May 31, 2004 (JP) .............................. 2004-161708

(51) Int. Cl.
*F16H 59/00* (2006.01)
*F16H 61/00* (2006.01)

(52) U.S. Cl. ............................................. 474/8; 474/18
(58) Field of Classification Search ..................... 474/8, 474/18, 28; 464/162
See application file for complete search history.

(56) References Cited

U.S. PATENT DOCUMENTS

| | | | | |
|---|---|---|---|---|
| 3,234,758 | A | * | 2/1966 | Lewis ........................... 464/16 |
| 3,367,142 | A | * | 2/1968 | Groves et al. ................ 464/162 |
| 3,508,418 | A | * | 4/1970 | Jones .......................... 464/162 |
| 6,241,635 | B1 | * | 6/2001 | Schmid et al. ................ 474/11 |
| 7,131,921 | B2 | * | 11/2006 | Walter et al. ................... 474/8 |
| 2002/0011148 | A1 | * | 1/2002 | Weissflog ..................... 91/418 |
| 2003/0073502 | A1 | * | 4/2003 | Barnley et al. ............... 464/162 |
| 2004/0192449 | A1 | * | 9/2004 | Smith .......................... 464/162 |
| 2004/0235596 | A1 | | 11/2004 | Otaki et al. |

FOREIGN PATENT DOCUMENTS

| | | |
|---|---|---|
| DE | 199 09 347 A1 | 9/1999 |
| DE | 100 25 978 C1 | 1/2002 |
| EP | 0 777 070 A1 | 6/1997 |
| JP | 63-140151 | 6/1988 |
| JP | 63-164648 | 10/1988 |
| JP | 6-341500 | 12/1994 |
| JP | 11-264704 | 9/1999 |
| WO | WO 2004/025142 A1 | 3/2004 |
| WO | WO2004025142 A1 * | 3/2004 ................... 474/8 |
| WO | WO 2005/093296 A1 | 10/2005 |

OTHER PUBLICATIONS

Mechanical Engineering Handbook, Jun. 30, 2000, pp. 508 and 509.
G. Wagner, et al., "CFT30—A Chain Driven CVT for FWD 6 Cylinder Application", SAE Technical Paper Series; 2004-01-0648; Mar. 8-11, 2004; pp. 1-7.

* cited by examiner

*Primary Examiner*—Robert A Siconolfi
*Assistant Examiner*—Robert T Reese
(74) *Attorney, Agent, or Firm*—Oblon, Spivak, McClelland, Maier & Neustadt, L.L.P.

(57) ABSTRACT

A belt type continuously variable transmission includes an adjustable sheave which is provided with a fixed rotor fixed to a revolving shaft and with a movable rotor attached to the revolving shaft by spline fit in a manner inhibiting their relative rotation and allowing axial displacement so that a groove width is adjustable between the movable rotor and the fixed rotor, wherein the revolving shaft is provided with a load supporting portion on which tip surfaces of spline teeth of the movable rotor are in slide contact, whereby a radial load from the movable rotor is supported by the load supporting portion.

12 Claims, 2 Drawing Sheets

BELT TYPE CONTINUOUSLY VARIABLE TRANSMISSION

This application is based on Japanese Patent Application No. 2004-161708 filed May 31, 2004, the contents of which are incorporated hereinto by reference.

BACKGROUND OF THE INVENTION

1. Field of the Invention

The present invention relates to a belt type continuously variable transmission for transmitting the revolution of an input shaft to an output shaft by changing the revolution ratio steplessly and, in particular, to the structure of a movable rotor for supporting a radial load and of a revolving shaft onto which the movable rotor is fit in a manner inhibiting their relative rotation and allowing axial displacement.

2. Description of Related Art

A belt type continuously variable transmission for vehicles comprises: a pair of revolving shafts mutually in parallel; a primary-side sheave (input-side pulley) supported in a revolvable manner by the revolving shaft on the input side and having an adjustable groove width; a secondary-side sheave (output-side pulley) identically supported in a revolvable manner by the revolving shaft on the output side and having an adjustable groove width; and a drive belt wound around the primary-side sheave and the secondary-side sheave constituting the above-mentioned pair, whereby the effective diameter of the primary-side sheave and the effective diameter of the secondary-side sheave are varied so that the revolution ratio is varied steplessly.

For example, each of the above-mentioned sheaves comprises: a fixed rotor fixed to the revolving shaft in a manner inhibiting their relative displacement; and a movable rotor fit onto the revolving shaft in a manner inhibiting their relative rotation and allowing relative axial displacement, whereby when the movable rotor is moved in an axial direction so that the distance to the fixed rotor is varied, then the groove width is varied so that the wind-around diameter, that is, the effective diameter, of the drive belt is varied.

In the connection (linkage) between the above-mentioned movable rotor and the revolving shaft, ball splines are used in general. Nevertheless, such a fit structure via ball splines results in a high cost. Thus, methods have been proposed for fitting a movable rotor onto a revolving shaft in a manner inhibiting their relative rotation and allowing relative axial displacement without the use of ball splines. An example is given in Japanese Published Unexamined Patent Application No. H6-341500.

SUMMARY OF THE INVENTION

An employable structure for connecting a movable rotor and a revolving shaft without using ball splines is a spline fit using spline teeth of a type such as involute splines that engage in a manner allowing their relative axial displacement. Nevertheless, in this case, there has been a problem that the strength of the revolving shaft becomes insufficient depending on the structure for supporting the radial load between the movable rotor and the revolving shaft. FIG. 5 shows an example of a possible structure for connecting a movable rotor and a revolving shaft without using ball splines. In this structure, a cylinder portion 106 separate from spline teeth 104 is formed in a shank 102 of a movable rotor 100. Then, the radial load is supported between the cylinder portion 106 and a cylindrical load supporting portion 112 of the revolving shaft 110, where the load supporting portion has a diameter establishing slide contact on the cylinder portion 106. Nevertheless, in this structure, in order to allow the movable rotor 100 to be attached onto the revolving shaft 110, the inner diameter of the cylinder portion 106 of the movable rotor 100 is required to be smaller than the tip diameter (inner diameter) of the spline teeth 104 of the movable rotor 100. Thus, the outer diameter of the cylindrical load supporting portion 112 of the revolving shaft 110 needs to also be smaller. This causes a possibility that the revolving shaft 110 is too thin and hence its strength is insufficient.

Furthermore, in the case where the cylinder portion 106 separate from the spline teeth 104 is provided in the movable rotor 100 as shown in FIG. 5, the spline teeth 104 cannot be fabricated by broach shaping and requires shaver shaping. This causes a problem of a disadvantage in productivity.

The invention has been devised by considering these situations. An object of the invention is to provide a belt type continuously variable transmission in which a spline fit structure is used and still the strength of the revolving shaft is improved and so is the productivity.

The first aspect of the invention provides a belt type continuously variable transmission comprising an adjustable sheave which is provided with a fixed rotor fixed to a revolving shaft and with a movable rotor attached to the revolving shaft by spline fit in a manner inhibiting their relative rotation and allowing axial displacement so that a groove width is adjustable between the movable rotor and the fixed rotor, wherein the revolving shaft is provided with a load supporting portion on which tip surfaces of spline teeth of the movable rotor are in slide contact, whereby a radial load from the movable rotor is supported by the load supporting portion.

According to the invention, the diameter of the load supporting portion of the revolving shaft is expanded to a size establishing slide contact on the tip surfaces of the spline teeth of the movable rotor. Thus, the strength is improved in the revolving shaft in comparison with the structure of FIG. 5 where the outer diameter of the load supporting portion of the revolving shaft is required to be smaller than the inner diameter of the tip surfaces of the spline teeth of the movable rotor. Furthermore, the movable rotor is not required to be provided, separately from the spline teeth, with a cylinder portion having a bore of a diameter smaller than the tip diameter (inner diameter) of the spline teeth. This allows the spline teeth of the movable rotor to be fabricated by broach shaping, and hence improves productivity.

The second aspect of the invention provides the belt type continuously variable transmission according to the first aspect of the invention, wherein: (a) the movable rotor is provided with a cylinder portion for fitting onto the revolving shaft and with a flange portion extending from a pedestal end of the cylinder portion toward an outer periphery; (b) the spline teeth of the movable rotor are formed longitudinally in a shaft axis direction in an inner circumference surface of the cylinder portion of the movable rotor; (c) spline teeth of the revolving shaft are formed in a part of a shaft axis direction of an intermediate portion of the revolving shaft; and (d) a part of the intermediate portion of the revolving shaft where the spline teeth are not formed is provided with a cylindrical load supporting surface on which the tip surfaces of the spline teeth of the movable rotor are in slide contact. This configuration improves the strength of the revolving shaft, and permits easy fabrication of the spline teeth of the movable rotor.

The third aspect of the invention provides the belt type continuously variable transmission according to the second aspect of the invention, wherein the cylindrical load supporting surface has a diameter larger than a bottom diameter of the spline teeth of the revolving shaft and smaller than a tip diameter of the spline teeth. This configuration improves the strength of the revolving shaft.

The fourth aspect of the invention provides the belt type continuously variable transmission according to the second or third aspect of the invention, wherein the cylindrical load supporting surface has a diameter slightly smaller than a tip diameter of the spline teeth on which the tip surfaces of the spline teeth of the movable rotor can come into slide contact. This configuration permits smooth sliding between the cylindrical load supporting surface and the tip surfaces of the spline teeth of the movable rotor.

The fifth aspect of the invention provides the belt type continuously variable transmission according to any one of the second to fourth aspects of the invention, wherein a part of the spline teeth of the movable rotor located on the fixed rotor side is into spline fit with the spline teeth of the revolving shaft, while the tip surfaces of another part of the spline teeth are in slide contact on the cylindrical load supporting surface. According to this configuration, a part of the spline teeth of the movable rotor distant from said fixed rotor is in slide contact on said cylindrical load supporting surface. This reduces the face pressure resulting from a load generated by the pinching pressure of the drive belt, and hence improves durability.

The sixth aspect of the invention provides the belt type continuously variable transmission according to any one of the second to fifth aspects of the invention, wherein the revolving shaft comprises: a distal end portion; an intermediate portion a diameter of which is larger than that of the distal end portion and onto which the cylinder portion of the movable rotor is slidably fit; and a pedestal portion a diameter of which is larger than the intermediate portion and onto which the flange portion is slidably fit. This configuration improves the strength of the revolving shaft.

DETAILED DESCRIPTION OF EXEMPLARY EMBODIMENTS

Figure 1:
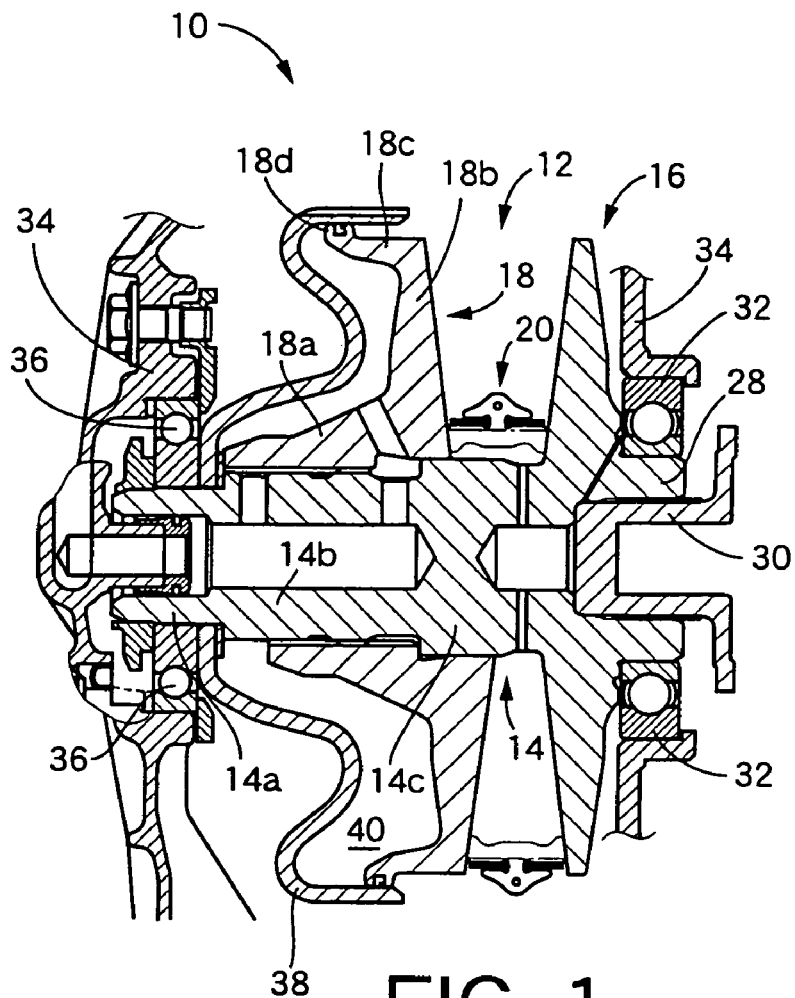
FIG. 1 is a sectional view showing a part of a belt type continuously variable transmission according to an embodiment of the invention.

An embodiment of the invention is described below. FIG. 1 is a sectional view showing a part of a belt type continuously variable transmission 10 according to an embodiment of the invention.

FIG. 1 shows a primary-side sheave 12 serving as an input-side sheave. In FIG. 1, the input-side sheave 12 comprises: a fixed rotor 16 integrally fixed to a primary-side revolving shaft 14; and a movable rotor 18 attached to the primary-side revolving shaft 14 in a manner allowing axial displacement and inhibiting relative rotation around the axis, so that the sliding of the movable rotor 18 in the axial directions allows the groove width between the fixed rotor 16 and the movable rotor 18 to be adjustable. A drive belt 20 is pinched between the fixed rotor 16 and the movable rotor 18, and hence the wind-around diameter of the drive belt 20 is adjustable in the primary-side sheave 12.

Figure 2:
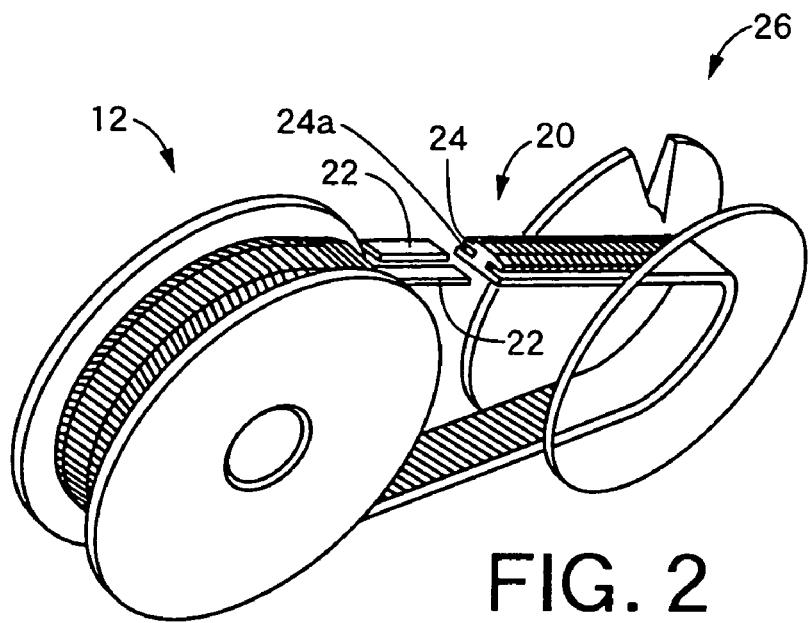
FIG. 2 is a perspective view of a belt type continuously variable transmission of FIG. 1.

As shown in FIG. 2, the entire drive belt 20 is endless and annular. The drive belt 20 comprises: a pair of hoops 22 each having the shape of an endless and annular tape; and a large number of belt blocks 24 mutually stacked close in their thickness direction along a pair of the hoops 22. The hoops 22 engage within a pair of hoop engagement grooves 24a each formed in the belt blocks 24 such as to have an opening toward a side direction. The drive belt 20 winds around the input-side sheave 12 and an output-side sheave 26 each revolving about each of the revolving shaft axes in parallel to each other. The output-side sheave 26 is formed on a secondary-side revolving shaft not shown, and is constructed similarly to the input-side sheave 12. Thus, description is omitted.

Returning to FIG. 1, the fixed rotor 16 is provided with a cylindrical shank 28 protruding in an axial direction on the opposite side to the primary-side revolving shaft 14. An input shaft 30 (an output shaft of a torque converter not shown) is attached within an inner circumference of the shank 28 by spline fit. The shank 28 is supported by a case 34 of an automatic transmission mechanism in a manner allowing their relative rotation via a bearing 32 disposed on the outer periphery.

The primary-side revolving shaft 14 comprises: a distal end portion 14a supported by the case 34 via a bearing 36; an intermediate portion 14b having a larger outer diameter than the distal end portion 14a and constituting an intermediate portion in the axial direction of the primary-side revolving shaft 14; and a pedestal portion 14c located on the opposite side to the distal end portion 14a relative to the intermediate portion 14b and having a larger outer diameter than the intermediate portion 14b. A smaller diameter-side end of a cylindrically shaped cylinder body 38 having a larger diameter on the movable rotor 18 side is fit onto the outer periphery of the distal end portion 14a at the end of the intermediate portion 14b side.

The movable rotor 18 comprises: a cylinder portion 18a fit onto the outer periphery of the intermediate portion 14b of the primary-side revolving shaft 14; a disc-shaped flange portion 18b integrally connected to the fixed rotor 16 side in the axial direction of the cylinder portion 18a and fit onto the outer periphery of the pedestal portion 14c of the primary-side revolving shaft 14; and an outside tube portion 18c extending from an outer peripheral edge of the flange portion 18b toward a direction parallel to the shaft axis. The other end of the outside tube portion 18c is provided with an annular ridge 18d an outer periphery of which is oil-tight in slide contact on an inner circumference surface of the cylinder body 38 fixed to the primary-side revolving shaft 14. The movable rotor 18 having this configuration and the above-mentioned cylinder body 38 forms an oil chamber 40. The movable rotor 18 serves as a piston to which a thrust in the shaft axis direction is imparted in response to a pressure in the oil chamber 40.

Figure 3:
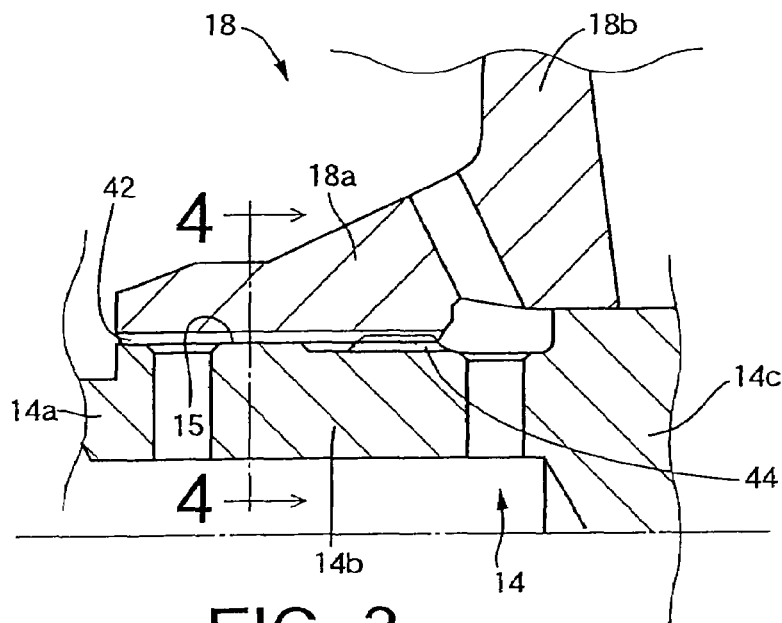
FIG. 3 is a partially enlarged view of FIG. 1.
Figure 4:
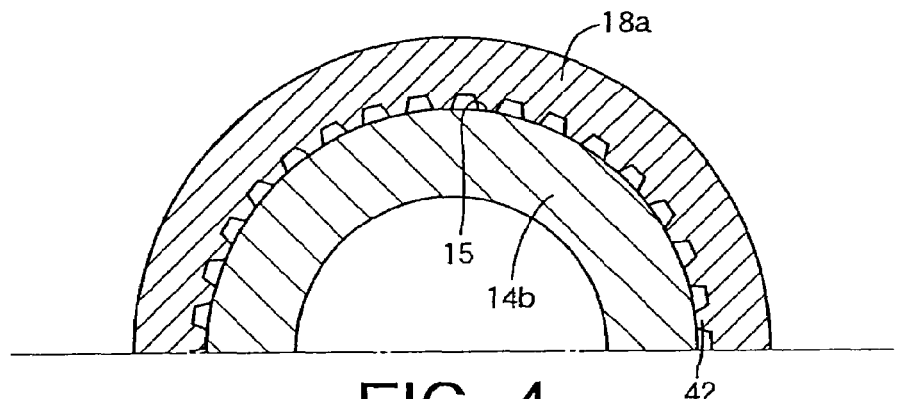
FIG. 4 is a sectional view of FIG. 3 taken along line 4-4.

FIG. 3 is a partially enlarged view of FIG. 1. FIG. 4 is a sectional view of FIG. 3 taken along line 4-4. As shown in FIG. 3, the inner circumference surface of the cylinder portion 18a of the movable rotor 18 is provided with spline teeth 42 which longitudinally span from the distal end of the cylinder portion 18a to the end of the flange portion 18b side. On the other hand, the outer peripheral surface of the intermediate portion 14b of the primary-side revolving shaft 14 is provided with spline teeth 44 engaging with the above-mentioned spline teeth 42 in a part of the pedestal portion 14c side in a slidable manner in the shaft axis directions. Thus, the approximate entire portion in the axial direction the spline teeth 44 of the primary-side revolving shaft 14 engage with the spline teeth 42 of the movable rotor 18, while only a part in the axial direction of the spline teeth 42 of the movable rotor 18 side engage with the spline teeth 44 of the primary-side revolving shaft 14. These spline teeth 42 and 44 are composed of involute splines constructed from well known involute cylindrical gears, and engage with each other by spline fit.

As shown in FIG. 3 and FIG. 4, a part of the distal end portion 14a side where the spline teeth 44 are not formed in the intermediate portion 14b of the primary-side revolving shaft 14 is provided with a cylindrical peripheral surface 15 having a diameter larger than the bottom diameter of the spline teeth 44 and smaller than the tip diameter of the spline teeth 44. The cylindrical peripheral surface 15 has approximately the same diameter as the crest diameter of the spline teeth 42 but slightly smaller than the crest diameter so that slide contact can be formed with the tooth crests of the spline teeth 42 in a part of the movable rotor 18 side. Accordingly, the intermediate portion 14b of the primary-side revolving shaft 14 serves as a load supporting portion for receiving the load from the cylinder portion 18a of the movable rotor 18. Thus, a part of the spline teeth 42 of the movable rotor 18 side, together with the cylindrical peripheral surface 15 of the intermediate portion 14b of the primary-side revolving shaft 14 in slide contact with the spline teeth 42, constitute a structure for receiving the radial load.

Figure 5:
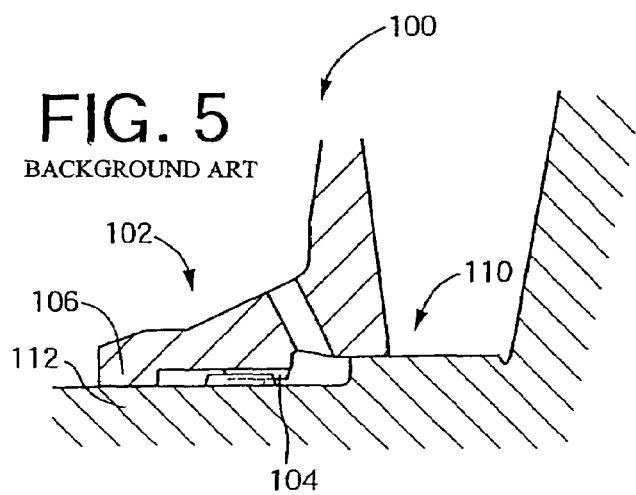
FIG. 5 is a sectional view of a main part of a prior art belt type continuously variable transmission.

As described above, according to the present embodiment, the diameter of the intermediate portion 14b of the primary-side revolving shaft 14 serving as the load supporting portion is expanded to a size establishing slide contact on the tip surfaces of the spline teeth 42 of the movable rotor 18. Thus, the strength is improved in the primary-side revolving shaft 14 in comparison with the structure of FIG. 5 where the outer diameter of the cylindrical load supporting portion 112 of the revolving shaft 100 is required to be smaller than the inner diameter of the tip surfaces of the spline teeth 104 of the movable rotor 100. Furthermore, the movable rotor 18 is not required to be provided with a cylinder portion separate from the spline teeth 42. This allows the spline teeth 42 of the movable rotor 18 to be fabricated by broach shaping, and hence improves productivity.

According to the present embodiment, (a) the movable rotor 18 comprises: the cylinder portion 18a fitting into the revolving shaft 14; and the flange portion 18b extending from the pedestal end of the cylinder portion 18a to the outer periphery side. Furthermore, (b) the spline teeth 42 of the movable rotor 18 are formed in the inner circumference surface of the cylinder portion 18a of the movable rotor 18 longitudinally in the shaft axis direction. (c) The spline teeth 44 of the revolving shaft 14 are formed in a part of the shaft axis direction of the intermediate portion 14b of the revolving shaft 14. (d) A part where the spline teeth 44 is not formed in the intermediate portion 14b of the revolving shaft 14 is provided with the cylindrical load supporting surface 15 on which the tip surfaces of the spline teeth 42 of the movable rotor 18 is in slide contact. This improves the strength of the revolving shaft 14, and permits easy fabrication of the spline teeth 42 of the movable rotor 18.

According to the present embodiment, the cylindrical load supporting surface 15 has a diameter larger than the bottom diameter of the spline teeth 44 of the revolving shaft 14 and smaller than the tip diameter of the spline teeth 44. This improves the strength of the revolving shaft 14.

According to the present embodiment, the cylindrical load supporting surface 15 has a diameter slightly smaller than the tip diameter of the spline teeth 42 of the movable rotor 18 on which the tip surfaces of the spline teeth 42 of the movable rotor 18 can come into slide contact. This permits smooth sliding between the cylindrical load supporting surface 15 and the tip surfaces of the spline teeth 42 of the movable rotor 18.

According to the present embodiment, in the spline teeth 42 of the movable rotor 18, a part thereof on the fixed rotor 16 side form spline fit with the spline teeth 44 of the revolving shaft 14. Another part of the tip surfaces form slide contact on the above-mentioned cylindrical load supporting surface 15. Thus, a portion of the spline teeth 42 of the movable rotor 18 distant from the fixed rotor 16 form slide contact on the cylindrical load supporting surface 15. This reduces the face pressure resulting from the load generated by the pinching pressure of the drive belt 20, and hence improves durability.

According to the present embodiment, the revolving shaft 14 comprises: the distal end portion 14a; the intermediate portion 14b which has a larger diameter than the distal end portion 14a and onto which the cylinder portion 18a of the movable rotor 18 is fit; and the pedestal portion 14c which has a larger diameter than the intermediate portion 14b and onto which the flange portion 18b is fit. This configuration improves the strength of the revolving shaft 14.

In the above, an embodiment of the invention has been described. However, the invention may be implemented in other modes employing various modifications and improvements based on the knowledge of a person skilled in the art.

For example, the embodiment has been described for the case that the invention is applied to the input-side sheave 12. However, the invention is applicable also to the output-side sheave.

The above-mentioned embodiment, the movable rotor 18 and the revolving shaft 14 have been connected by involute splines. However, these may be connected by square-shaped splines.

The above-mentioned embodiment of the invention is merely illustrative. Various modifications and improvements may be added as long as they are included within the scope of the invention.

What is claimed is:

1. A belt type continuously variable transmission comprising:
    an adjustable sheave which is provided with a fixed rotor fixed to a revolving shaft and with a movable rotor attached to the revolving shaft by spline fit in a manner inhibiting their relative rotation and allowing axial displacement so that a groove width is adjustable between the movable rotor and the fixed rotor,
    wherein the revolving shaft is provided with a load supporting portion on which tip surfaces of spline teeth of the movable rotor are in slide contact, whereby a radial load from the movable rotor is supported by the load supporting portion,
    wherein the load supporting portion on which tip surfaces of spline teeth of the movable rotor are in contact has a diameter larger than a bottom diameter of spline teeth of the revolving shaft, and
    wherein the load supporting portion on which tip surfaces of spline teeth of the movable rotor are in contact is offset from spline teeth of the revolving shaft along the direction of axial displacement.

2. The belt type continuously variable transmission according to claim 1, wherein:
    the movable rotor is provided with a cylinder portion for fining onto the revolving shaft and with a flange portion extending from a pedestal end of the cylinder portion toward an outer periphery;

the spline teeth of the movable rotor are formed longitudinally in a shaft axis direction in an inner circumference surface of the cylinder portion of the movable rotor;

spline teeth of the revolving shaft are formed in a part of a shaft axis direction of an intermediate portion of the revolving shaft; and the load supporting portion is a part of the intermediate portion of the revolving shaft where the spline teeth are not formed and is provided with a cylindrical load supporting surface on which the tip surfaces of the spline teeth of the movable rotor are in slide contact.

3. The belt type continuously variable transmission according to claim 2, wherein the cylindrical load supporting surface has a diameter smaller than a tip diameter of the spline teeth.

4. The belt type continuously variable transmission according to claim 2, wherein the cylindrical load supporting surface has a diameter slightly smaller than a tip diameter of the spline teeth of the movable rotor on which the tip surfaces of the spline teeth of the movable rotor is capable of coming into slide contact.

5. The belt type continuously variable transmission according to claim 2, wherein a part of the spline teeth of the movable rotor located closest to the fixed rotor is spline fit with the spline teeth of the revolving shaft, while the tip surfaces of another part of the spline teeth are in slide contact on the cylindrical load supporting surface.

6. The belt type continuously variable transmission according to claim 2, wherein the revolving shaft comprises:

a distal end portion;

an intermediate portion a diameter of which is larger than that of the distal end portion and onto which the cylinder portion of the movable rotor is slidably fit; and a pedestal portion, a diameter of which is larger than the intermediate portion and onto which the flange portion is slidably fit.

7. The belt type continuously variable transmission according to claim 5, wherein the spline teeth of the movable rotor extend from a first end of the cylinder portion of the movable rotor to a second end of the cylinder portion of the movable rotor opposite the first end.

8. The belt type continuously variable transmission according to claim 5, wherein the spline teeth of the movable rotor are longer than the spline teeth of the revolving shaft.

9. The belt type continuously variable transmission according to claim 1, wherein the load supporting portion on which tip surfaces of spline teeth of the movable rotor are in contact has a diameter smaller than a tip diameter of spline teeth of the revolving shaft.

10. The belt type continuously variable transmission according to claim 1, wherein the load supporting portion is a cylindrical surface extending completely around the revolving shaft.

11. The belt type continuously variable transmission according to claim 1, wherein the movable rotor faces an oil chamber and moves along the direction of axial displacement in response to pressure inside the oil chamber.

12. The belt type continuously variable transmission according to claim 11, wherein the oil chamber includes a seal disposed on an outermost portion, in a radial direction, of the movable rotor.

* * * * *